United States Patent
Månsson

(10) Patent No.: US 8,313,786 B2
(45) Date of Patent: Nov. 20, 2012

(54) METHOD OF IMPROVING THE EFFICIENCY OF FAT SEPARATION IN THE SEPARATION OF A LIQUID FOOD PRODUCT

(75) Inventor: Rolf Månsson, Veberod (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 407 days.

(21) Appl. No.: 12/593,365

(22) PCT Filed: Apr. 1, 2008

(86) PCT No.: PCT/SE2008/000236
§ 371 (c)(1),
(2), (4) Date: Sep. 28, 2009

(87) PCT Pub. No.: WO2008/156403
PCT Pub. Date: Dec. 24, 2008

(65) Prior Publication Data
US 2010/0119676 A1 May 13, 2010

(30) Foreign Application Priority Data
Jun. 21, 2007 (SE) .................................. 0701517

(51) Int. Cl.
*A23C 9/15* (2006.01)
(52) U.S. Cl. ........................ 426/491; 426/580
(58) Field of Classification Search .................. 426/491, 426/580
See application file for complete search history.

(56) References Cited

U.S. PATENT DOCUMENTS

| | | | | |
|---|---|---|---|---|
| 1,683,728 A | * | 9/1928 | Rushton | 426/330.2 |
| 2,264,665 A | * | 12/1941 | Hall | 426/417 |
| 2,567,898 A | * | 9/1951 | Staaff | 426/231 |
| 3,189,266 A | | 6/1965 | Palmqvist | |
| 3,332,615 A | | 7/1967 | Aule | |
| 4,144,804 A | * | 3/1979 | O'Keefe et al. | 99/452 |
| 4,414,804 A | * | 11/1983 | Menard et al. | 60/786 |
| 5,260,079 A | * | 11/1993 | Zettier et al. | 426/231 |
| 5,928,702 A | | 7/1999 | Lidman et al. | |
| 6,228,409 B1 | * | 5/2001 | Axelsson | 426/397 |

FOREIGN PATENT DOCUMENTS

| DE | 198 07 294 A1 | 9/1999 |
|---|---|---|
| GB | 665647 | 1/1952 |
| WO | WO 94/24878 A1 | 11/1994 |
| WO | WO 2005/086994 A1 | 9/2005 |

OTHER PUBLICATIONS

International Search Report (PCT/ISA/210) dated Sep. 15, 2008.

* cited by examiner

*Primary Examiner* — Carolyn Paden
(74) *Attorney, Agent, or Firm* — Buchanan Ingersoll & Rooney PC

(57) ABSTRACT

A method of improving the efficiency of fat separation in the separation of a liquid food product with a certain fat content. The method comprises the liquid food product is caused to pass two separators connected in parallel, a first and a second, in which the product is divided up into a lighter and a heavier phase. The first separator is regulated so that the lighter phase will have a fat content which is less than 15%. The lighter phase from the first of the separators connected in parallel is led into the inlet conduit to the second of the separators connected in parallel.

14 Claims, 1 Drawing Sheet

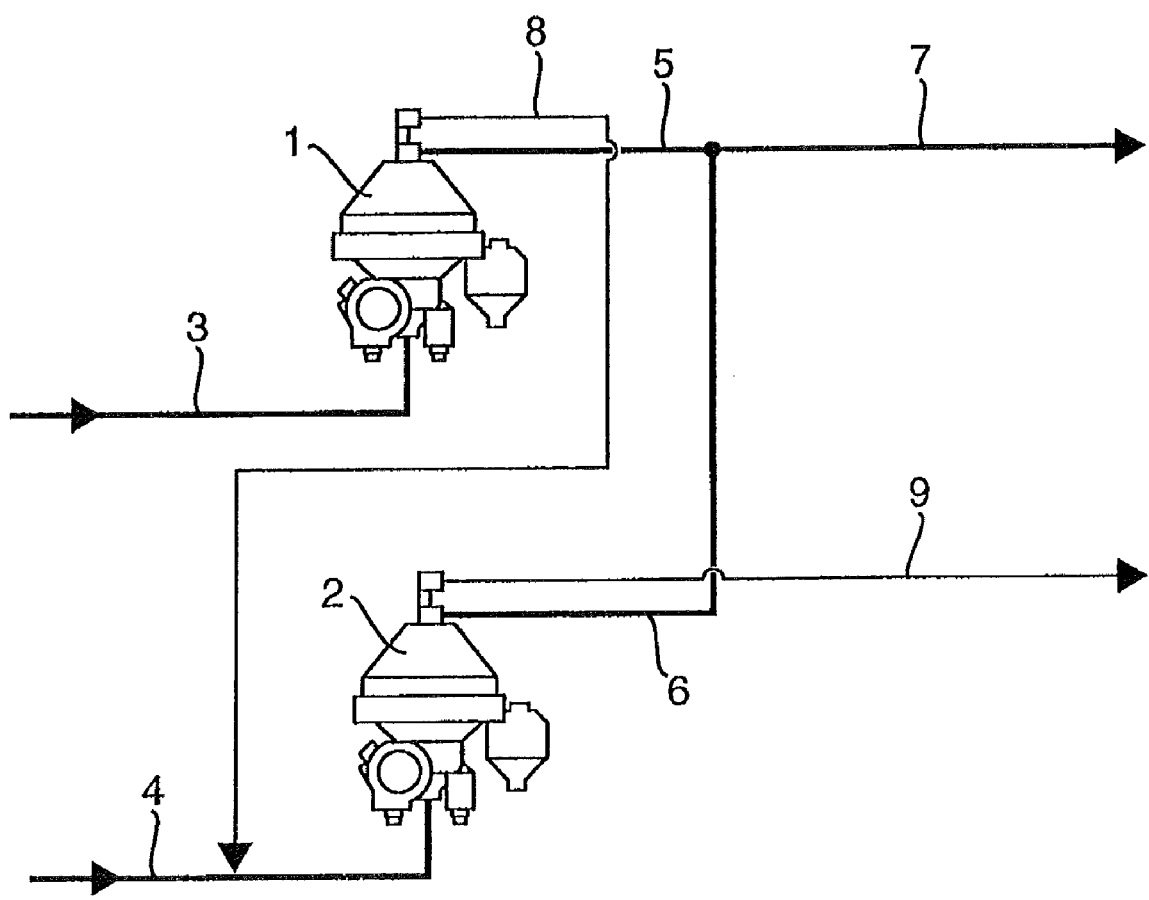

007
METHOD OF IMPROVING THE EFFICIENCY OF FAT SEPARATION IN THE SEPARATION OF A LIQUID FOOD PRODUCT

TECHNICAL FIELD

The present invention relates to a method of improving the efficiency of fat separation in the separation of a liquid food product of a certain fat content, comprising the steps that the liquid food product is caused to pass at least two separators connected in parallel, a first and a second separator, each with an inlet conduit for product and in which separators the product is divided up into a lighter phase and a heavier phase, and that the first separator is regulated so that the lighter phase has a fat content which is less than 15%.

BACKGROUND ART

Separation is an industrial process which is often used in the food industry. Fat separation by such a process is used, for example, for milk and whey. The separation normally takes place in a centrifugal separator.

In its interior, the separator has a number of conical inserts disposed in a stack with a well-defined spacing between the inserts. The inserts are provided with distribution holes which are vertically disposed. Through these holes, the milk or whey arrives from the inlet into the separation section proper and is subjected to centrifugal force. Particles and impurities in the milk or the whey move outwards along the surfaces of the inserts and are accumulated in a sediment tank. The lighter phase of the liquid food, i.e. the fat/the cream, moves inwards along the surfaces of the inserts towards the rotation shaft and is conveyed out from the separator through an axial outlet. The heavier phase, which may consist of skimmed milk or whey which has been freed of fat globules, moves outwards along the surfaces of the inserts and is accumulated to an outlet. Modern separators may have different constructive concepts. The present invention may be employed for all types of centrifugal separators.

One common area of use for the separation process is the separation of milk, where the milk is separated into a skimmed milk phase and a cream phase. Thereafter, the milk may be standardised, for example to consumer milk possessing the desired fat content, in that a part of the cream phase is recycled back to the skimmed milk phase.

The separation process is also employed to extract fat from whey. Whey is a by-product in cheesemaking and, since roughly a third of the world's milk production is used for cheesemaking, this implies that almost a third of all milk becomes whey. Whey, which had previously only been employed as animal feed and as fertilizer, risked becoming an environmental problem. Today, whey has more or less come to be considered as a valuable raw material in the production of protein with a high nutrient value. The fat which is extracted from the whey is normally recycled to the cheesemaking process or to other parts of the dairy process.

It is an attractive option to increase the fat separation in all separation processes, above all in the separation of whey. By separating off more fat from the whey, a more efficient and more economical process can be obtained in a later production of protein.

Earlier attempts to increase the yield in the light phase, i.e. to extract more fat from the milk or whey have involved the use of larger separators. Larger separators imply larger capital costs, both as investment costs and as operational costs.

Swedish Patent Specification SE 526828 describes a method for improving the efficiency of the fat separation in whey separation. The whey is separated in a first separator or alternatively several separators. The light phase from this or these separators is thereafter separated in a second separator. In order to obtain a good level of capacity for this method, at least two first separators are required, whereafter an additional separator is also required.

OBJECT OF THE INVENTION

One object of the present invention is to realise a method which renders further economical the separation of fat from a liquid food product, in that only two separators are necessary for carrying the method into effect.

SOLUTION

This and other objects have been attained according to the present invention in that the method of the type described by way of introduction has been given the characterising feature that the lighter phase from the first of the separators connected in parallel is led into the inlet conduit to the second of the separators connected in parallel.

Preferred embodiments of the present invention have further been given the characterising features as set forth in the appended subclaims.

BRIEF DESCRIPTION OF THE ACCOMPANYING DRAWING

One preferred embodiment of the present invention will now be described in greater detail hereinbelow, with reference to the accompanying Drawing, in which:

FIG. 1 illustrates a flow diagram for separation according to the present invention.

The Drawing shows only those parts and details essential to an understanding of the present invention, the placing of the separation process in a food plant, which is well-known to a person skilled in the art, having been omitted.

DESCRIPTION OF PREFERRED EMBODIMENT

FIG. 1 shows a flow diagram for a separation process according to the present invention. The separation process comprises at least two separators 1, 2 connected in parallel. Three or more separators 1 connected in parallel may also occur. The separators 1, 2 are centrifugal separators and they may consist of all constructions known on the market.

The food product may be raw milk with a fat content of 3.5-8.5%, or alternatively whey which normally has a fat content of 0.2-0.4%. Milk is normally separated at a temperature of 40-60° C., but lower temperatures may also occur. The whey is at the temperature which it has when it leaves the cheesemaking tank, normally 30-50° C. Processes which result in higher temperatures may also occur.

Each of the two separators 1, 2 connected in parallel has a conduit 3, 4 which leads the liquid food product into each respective separator 1, 2. In the separators 1, 2, the product is divided into a lighter and a heavier phase, at the same time as particles and impurities are removed from the product. The heavier phase, which consists of skimmed milk, or alternatively fat-free whey, leaves the separators 1, 2, through a conduit 5, 6, respectively. The conduits 5, 6 from the separators 1, 2 connected in parallel are united into a common conduit 7 for further treatment of the heavier phase. When the method is employed for whey, the heavier phase has a fat content which in many cases is lower than 0.05%. The fat content of the heavier phase is dependent upon the process.

The lighter phase, which consists of cream or fat from the whey, leaves the one 1 of the separators connected in parallel through a conduit 8. The conduit 8 leads to the inlet conduit 4 which provides the second 2 of the separators connected in parallel with product.

The product, when it consists of whey, has a fat content of 0.2-0.4% when it enters into the inlet conduit 3, 4 of each respective separator 1, 2. When the second separator 2 has an increased inlet flow in that the light phase from the first separator 1 is supplied to the inlet conduit 4 of the second separator 2, the second separator 2 will be supplied with a product which has a fat content of 0.4-0.8%.

The first separator 1 is regulated so that the lighter phase has a fat content of less than 15%. Preferably, the lighter phase has a fat content of 1-8%. This is achieved by increasing the flow in the lighter phase, which entails that a larger number of smaller fat globules accompany the lighter phase which passes out through the conduit 8.

The lighter phase which leaves the second separator 2 through the outlet conduit 9 has a fat content of up to 40%.

If three separators 1, 2 are employed in the process, the lighter phase from two separators 1 is converged and led into the inlet conduit 4 of the third separator 2. If use is made of four separators 1, 2, two separators may operate in tandem in accordance with the above described method for two separators. Thereafter, each respective phase is converged. Alternatively, the light phase is converged from three or more separators 1 to the inlet conduit 4 to an additional separator 2. The heavier phase from all separators 1, 2 is converged to one conduit 7.

Despite the apparently slight quantities of increased fat separation, the method according to the present invention entails that there will be an increase of fat separation by 5-10% for a normal food plant. In addition to obtaining an increased quantity of fat as yield, there will be obtained, above all as regards whey, a heavier phase which has a smaller residual fat content than in conventional fat separation. This heavier phase constitutes a raw material for valuable protein extraction. In the protein extraction, it is a major advantage, and entails major savings, to have a lower residual fat content. A lower residual fat content of the whey, reduces not only investment costs but also running costs for a protein extraction plant.

The increased quantity of fat also has a commercial value. Either as an increased volume of cream or as an increased quantity of fat from whey which is normally recycled back to the cheesemaking process.

As will have been apparent from the foregoing description, the present invention realises a method which, in a simple and economical manner, improves the efficiency of separation of a liquid food so that there will be obtained an increased separation of fat. The increased separation of fat affords major advantages in subsequent processes, above all when the food product consists of whey.

The present invention should not be considered as restricted to that described above and shown on the Drawing, many modifications being conceivable without departing from the scope of the appended Claims.

What is claimed is:

1. A method of improving efficiency of fat separation in separation of a liquid food product with a certain fat content, comprising passing the liquid food product through at least two separators connected in parallel, the at least two separators comprising a first separator and a second separator, each of said at least two separators having an inlet conduit in fluid communication with a source of the liquid food product so that the liquid food product flows through the inlet conduit of the first separator and into the first separator and through the inlet conduit of the second separator and into the second separator, and in each of the first and second separators the liquid food product is divided into a heavier phase and a lighter phase possessing a higher fat content than the heavier phase, the first separator being regulated so that the lighter phase has a fat content less than 15%, wherein the lighter phase divided from the heavier phase by the first separator is led into the inlet conduit of the second separator so that the inlet conduit of the second separator conveys the lighter phase from the first separator together with the liquid food product to the second separator.

2. The method as claimed in claim 1, wherein the first separator is regulated so that the lighter phase will have a fat content which is 1-8%.

3. The method as claimed in claim 1, wherein the liquid food product consists of whey with a fat content of 0.2-0.6%.

4. The method as claimed in claim 1, wherein the liquid food product consists of whole milk with a fat content of 3.5-8.5%.

5. A method of improving fat separation efficiency associated with separating a liquid food product possessing a fat content, the method comprising:
   introducing the liquid food product into at least a first separator and a second separator connected in parallel to one another, the at least two separators comprising a first separator and a second separator, each of the at least two separators having an inlet conduit, the liquid food product being introduced into the first and second separators by way of the inlet conduit;
   dividing the liquid food product in the first and second separators into a lighter phase and a heavier phase, the lighter phase possessing a higher fat content than the heavier phase;
   regulating the first separator so that the lighter phase from the first separator has a fat content less than 15%; and
   introducing the lighter phase from the first separator into the inlet conduit to the second separator so that the lighter phase from the first separator flows into the interior of the second separator.

6. The method as claimed in claim 5, wherein the regulation of the first separator comprises regulating the first separator so that the lighter phase has a fat content of 1-8%.

7. The method as claimed in claim 5, wherein the introduction of the liquid food product into the first separator and the second separator comprises introducing whey with a fat content of 0.2-0.6% into the inlet of each of the first and second separators.

8. The method as claimed in claim 5, wherein the introduction of the liquid food product into the first separator and the second separator comprises introducing whole milk with a fat content of 3.5-8.5% into the inlet of each of the first and second separators.

9. The method as claimed in claim 5, wherein the lighter phase from the first separator is conveyed from the first separator to the second separator by way of a conduit extending from the first separator to the inlet conduit of the second separator.

10. The method as claimed in claim 5, wherein the heavier phase from the first separator and the heavier phase from the second separator are united in a common conduit and conveyed by way of the common conduit for further treatment.

11. A method for improving fat separation efficiency in separation of milk or whey, the method comprising:

introducing the milk or whey into a first inlet conduit in fluid communication with a first separator so that the milk or whey flows through the first inlet conduit and into the first separator;

operating the first separator to divide the milk or whey in the first separator into a heavier phase and cream or fat possessing a higher fat content than the heavier phase;

regulating operation of the first separator so that the cream or fat exiting the first separator possesses a fat content less than 15%;

introducing the milk or whey into a second inlet conduit in fluid communication with a second separator in parallel with the first separator;

introducing the cream or fat from the first separator into the second inlet conduit so that a product comprised of the cream or fat from the first separator and the milk or whey introduced into the second inlet conduit enters the second separator as a product to be separated; and operating the second separator to divide the product in the second separator into a heavier phase which is fed to a first outlet conduit and a lighter phase possessing a higher fat content than the heavier phase which is fed to a second outlet conduit.

12. The method according to claim 11, wherein the product entering the second separator possesses a fat content of 0.4%-0.8%.

13. The method according to claim 12, wherein the milk or whey introduced into the second inlet conduit possesses a fat content of 0.2%-0.4%.

14. The method according to claim 13, wherein the milk or whey introduced into the second inlet conduit possesses a fat content of 0.2%-0.4%.

* * * * *